United States Patent
Nanbu et al.

(10) Patent No.: US 6,750,271 B2
(45) Date of Patent: Jun. 15, 2004

(54) POLYMER PARTICLES

(75) Inventors: Hiromi Nanbu, Wakayama (JP); Kazuo Kuwahara, Wakayama (JP); Shinichi Tokunaga, Wakayama (JP)

(73) Assignee: Kao Corporation, Tokyo (JP)

( * ) Notice: Subject to any disclaimer, the term of this patent is extended or adjusted under 35 U.S.C. 154(b) by 274 days.

(21) Appl. No.: 09/951,443

(22) Filed: Sep. 14, 2001

(65) Prior Publication Data

US 2002/0055560 A1 May 9, 2002

(30) Foreign Application Priority Data

Sep. 14, 2000 (JP) ........................................ 2000-279447

(51) Int. Cl.$^7$ ................................................ C08K 9/10
(52) U.S. Cl. ........................ 523/201; 523/202; 523/205; 523/206
(58) Field of Search ................................ 523/201, 202, 523/205, 206; 428/402.2, 402.21, 402.22, 402.24; 427/213.34, 222

(56) References Cited

U.S. PATENT DOCUMENTS

| | | | | |
|---|---|---|---|---|
| 4,501,835 A | * | 2/1985 | Berke | 523/206 |
| 6,252,003 B1 | * | 6/2001 | Kuwahara et al. | 525/24.2 |
| 2001/0053803 A1 | * | 12/2001 | Kuwahara et al. | 523/201 |

FOREIGN PATENT DOCUMENTS

| JP | 2-300301 | 12/1990 |
|---|---|---|
| JP | 6-322670 | 11/1994 |
| JP | 11-286574 | 10/1999 |

* cited by examiner

*Primary Examiner*—Peter Szekely
(74) *Attorney, Agent, or Firm*—Oblon, Spivak, McClelland, Maier & Neustadt, P.C.

(57) ABSTRACT

The present invention provides polymer particles being capable of stably maintaining a hydrophobic protecting agent for skin and/or hair and a method of treating fibers by the polymer particles. It is polymer particles having a volume average particle diameter of 0.001 to 30 μm, which comprises an organic high-molecular polymer (a) as the wall membrane and a hydrophobic-protecting agent for skin and/or hair (b) as the core material, or chitosan and a polymer of an organic acid having reactive vinyl group and/or a salt thereof as the membrane wall and the protecting agent (b) as the core material; a fiber-treating agent comprising said polymer particles; fiber having said polymer particles present continuously or discontinuously on the surface thereof; or a fiber-treating method which comprises bringing said polymer particles or said fiber-treating agent into contact with fiber.

4 Claims, No Drawings

POLYMER PARTICLES

FIELD OF THE INVENTION

The present invention relates to polymer particles being useful for treatment of fiber, a fiber-treating agent comprising the polymer particles, fiber having the polymer particles being present on the surface thereof and a method of treating fiber by the polymer particles.

DESCRIPTION OF THE RELATED ART

In recent years, special processing contributing to very comfortable human health, such as deodorizing processing and antimicrobial deodorizing processing, is conducted in the field of fiber materials such as clothing and bedding being in direct contact with the human body.

On the other hand, hydrophobic protecting agents for skin- and/or hair, particularly ceramide, are excellent in the effect of improvement and/or treatment of skin and hair, so these protecting agents have been used in the field of cosmetics, but it is difficult to use these hydrophobic protecting agents in aqueous processing. Even if the protecting agents are used in treatment of fibers, they hardly remain on fibers in an amount enough to achieve a sufficient effect and the resulting fibers are poor in washing durability.

JP-A 6-322670 shows a process for processing fiber or textile with an inclusion compound of squalane or squalene in cyclodextrin.

JP-A 2-300301 shows fabric having thereon a humectant such as squalane, squalene, an alkyl myristate, miglyol, porcelain oil, a-oxanol, bee wax and lanolin or microcapsules thereof.

JP-A 11-286574, equivalent to US patent application Ser. No. 463415 or EP-A 1002810, shows a polymer emulsion including the polymer composed of the shell comprising a polymer of chitosan and a vinyl organic acid or a salt thereof and the core comprising a polymer of a hydrophobic monomer.

SUMMARY OF THE INVENTION

The purpose of the present invention is to provide polymer particles being capable of stably maintaining these hydrophobic protecting agents for skin- and/or hair and a method of treating fiber with the polymer particles.

The invention provides polymer particles having a volume average particle diameter of 0.001 to 30 $\mu$m, which satisfy at least one of conditions (A) and (B):

Condition (A) where the polymer particles comprise chitosan and a polymer (a) of an organic acid having a reactive vinyl group and/or of a salt thereof as the membrane wall and a hydrophobic protecting agent for skin and/or hair (referred to hereinafter as the protecting agent) (b) as the core material;

Condition (B) where the polymer particles comprise an organic high-molecular polymer (c) as the membrane wall and at least one member selected from the group consisting of:

(I) ceramide and/or structural analogues of ceramide and (II) $C_{24-44}$ dialkyl ethers.

It is preferable that the polymer particles comprise chitosan and a polymer (a) of an organic acid having a reactive vinyl group and/or of a salt thereof as the membrane wall and the protecting agent (b) and a polymer (d) of a hydrophobic monomer as the core material.

The invention moreover provides a method of treating fiber, which comprises bringing the polymer particles as defined above into contact with the fiber.

The invention provides a fiber product having the polymer particles as defined above continuously or discontinuously on the surface thereof.

The polymer particles may further comprise a polymer (d) of hydrophobic monomers.

Further, the present invention provides a fiber-treating agent comprising said polymer particles.

DETAILED DESCRIPTION OF INVENTION

[Membrane wall under Condition (A)]

<Chitosan>

The chitosan used in the present invention is a deacetylated product of chitin having (1→4)-2-acetamide-2-deoxy-$\beta$-D-glucan structure, and has (1→4)-2-amino-2-deoxy-$\beta$-D-glucan structure. Chitosan of the present invention encompasses chitosan derivatives wherein some deacetylated amino groups or some intramolecular hydroxyl groups have been chemically modified by acylation reaction, etherification reaction, esterification reaction or any other reaction. Generally, some acetamide groups of natural chitin are in the form of amino groups not acetylated, so the chitosan used in the present invention refers to the one having a degree of deacetylation of 30% or more.

<Polymer (a) of an Organic Acid Having Reactive Vinyl Group and/or of a Salt Thereof>

The polymer of an organic acid having a reactive vinyl group and/or a salt thereof used in the present invention is a polymer of a water-soluble organic acid having one or more reactive vinyl groups and one or more acidic groups in the molecule (hereinafter referred to as acidic monomer) and/or of a salt thereof, capable of dissolving chitosan to form an aqueous solution. Examples of the acidic monomer include unsaturated carboxylic acid monomers such as (meth) acrylic acid, crotonic acid, itaconic acid and maleic acid, unsaturated sulfonic acid monomers such as styrene sulfonic acid, 2-(meth)acrylamide-2-methyl propane sulfonic acid, 3-sulfopropyl(meth)acrylate, bis(3-sulfopropyl) itaconate and vinyl sulfonic acid, and unsaturated phosphate monomers such as vinyl phosphate, bis((meth) acryloyloxyethyl) phosphate, diphenyl-2-(meth) acryloyloxyethyl phosphate, and dibutyl-2-(meth) acryloyloxyethyl phosphate, dioctyl-2-(meth) acryloyloxyethyl phosphate. These may be used singly or in plurality. Among these acidic monomers, unsaturated carboxylic acid monomers having a relatively low acidity are preferable, and in particular, methacrylic acid for a low acidity of the polymer is the most preferable. The salt thereof includes a salt of an alkali metal such as Na and K, ammonium salts etc.

In the present invention, "(meth)acryl" means acryl or methacryl.

As to the compounding ratio of the organic acid having a vinyl reactive group or a salt thereof to chitosan, the organic acid having a vinyl reactive group or a salt thereof is compounded preferably in the range of 0.75 to 10 times as many moles as the monosaccharide unit of chitosan.

Along with these organic acids having a reactive vinyl group, various acids can be arbitrarily mixed. The type of mixed acid includes inorganic acids such as hydrochloric acid, sulfuric acid and phosphoric acid, and organic acids such as formic acid, acetic acid, lactic acid, citric acid, tartaric acid, succinic acid, malic acid, oxalic acid, glycolic acid, dichloroacetic acid and trifluoroacetic acid.

[Core Material Under Condition (A)]
<Hydrophobic Protecting Agent (b) for Skin and/or Hair>

As the core material, the hydrophobic protecting agent for skin and/or hair is not particularly limited insofar as it is hydrophobic, but preferably it has a solubility of less than 1 g in 100 g water at 20° C.

The protecting agent used in the present invention includes a humectant acting as an emollient on the skin, an agent acting as a protective membrane on the skin and the hair, an agent penetrating a horny layer and cuticles to trap free radicals, an agent having a structural water-retaining action, an agent having the activity of reinforcing and repairing cuticles, an antioxidant etc.

Examples of the protecting agent of the present invention include natural materials such as squalane, squalene, mink oil, jojoba oil, carnauba wax, beeswax, candelilla wax and lanolin, synthetic waxes such as Vaseline, microcrystalline wax, petroleum wax and polyethylene wax, higher alcohols such as lauryl alcohol, cetyl alcohol, stearyl alcohol, behenyl alcohol, lanoline alcohol, hydrogenated lanoline alcohol, isostearyl alcohol and cholesterol, esters such as isopropyl myristate, isopropyl lanolin fatty acid, myristin myristate, octyldodecyl myristate, glycerin trimyristate and cholesterol isostearate, vitamins such as vitamin A, vitamin E, panthenol and panthenyl ethyl ether, other materials such as paraffin, silicone and derivatives thereof, ceramide and structural analogues thereof, $C_{24-60}$ linear or branched solid alkyl ethers, $C_{12-22}$ alkyl group-containing alkanoyl taurine calcium salts, etc.

Among the materials described above, ceramide and structural analogues thereof, squalane, squalene, $C_{24-44}$ dialkyl ethers, and lauroyl taurine calcium salts are preferably used. It is more preferable to employ one or more members selected from the group consisting of:
(I) ceramide and/or structural analogues of ceramide and
(II) $C_{24-44}$ dialkyl ethers. It is particularly preferable to employ one or more members selected from the group consisting of ceramide and/or structural analogues of ceramide and distearyl ethers.

Ceramide and structural analogues thereof used in the present invention are particularly preferably those described in JP-A 5-213731, represented by formulae (1) and (2):

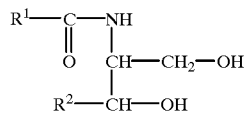

(1)

wherein $R^1$ and $R^2$ are the same as or different from each other and represent a $C_{8-26}$ linear or branched, saturated or unsaturated hydrocarbon group which may be substituted with one or more hydroxyl groups; and

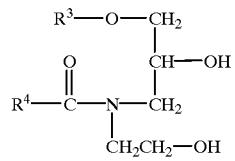

(2)

wherein $R^3$ represents a $C_{10-26}$ linear or branched, saturated or unsaturated hydrocarbon group and $R^4$ represents a $C_{9-25}$ linear or branched, saturated or unsaturated hydrocarbon group.

Ceramide and structural analogues thereof described above are used in producing polymer particles, preferably after the ceramide and structural analogues thereof are mixed with one or more cholesterol derivatives represented by the formula (3) described in JP-A 5-213731 in a ratio of from 95/5 to 5/95 by weight.

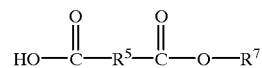

(3)

wherein $R^5$ represents $—(CH_2)_n—$ or $—CH_2—CHR^6—$, n is an integer of 2 to 10, $R^6$ represents a $C_{3-18}$ linear or branched alkyl or alkenyl group and $R^7$ represents the residue of cholesterol from which a hydroxyl's proton is excluded.

From the viewpoint of achieving an excellent effect of protecting the skin and the hair and improving the stability of the polymer particles, these protecting agents are incorporated into the polymer particles preferably in an amount of 0.1 to 50% by weight, more preferably 0.5 to 30% by weight and much more preferably 0.5 to 20% by weight.

<Polymer (d) of Hydrophobic Monomers>

It is preferable that the polymer particles satisfying Condition (A) of the present invention further include a polymer of a hydrophobic monomer(s) as a hydrophobic core material. The hydrophobic property may mean a solubility of 0.1 g or less in 100 g water at 20° C.

Such hydrophobic monomers include e.g. styrene, divinyl benzene, acrylates or methacrylates such as butyl (meth) acrylate, 2-ethylhexyl (meth)acrylate, cyclohexyl (meth) acrylate, decyl (meth)acrylate, dodecyl (meth)acrylate, dodecenyl (meth)acrylate, tetradecyl (meth)acrylate, hexadecyl (meth)acrylate, hexadecenyl (meth)acrylate, octadecyl (meth)acrylate, octadecenyl (meth)acrylate and behenyl (meth)acrylate, fluorine-containing monomers such as trifluoroethyl methacrylate, silicone macromers etc. Among these monomers, dodecyl (meth)acrylate and octadecyl (meth)acrylate are preferable.

When the two ingredients, that is, the hydrophobic monomer and the hydrophobic protecting agent for the skin and/or the hair are used as the hydrophobic material, it is preferable from the viewpoint of sufficient performance of chitosan and improvement of the stability of the polymer particles that the ratio of chitosan is preferably 1 to 5000 parts by weight, more preferably 2 to 300 parts by weight, based on 100 parts by weight of the hydrophobic materials.

[Membrane Wall Under Condition (B)]
<Organic Polymer (c)>

The organic polymer used in the present invention includes synthetic polymers, semi-synthetic polymers and natural polymers and may be prepared by various polymerization techniques such as interfacial polymerization, in situ polymerization and liquid-in-drying method, described below in details.

The synthetic high-molecular polymers include polystyrene, poly(meth)acryl, polyester, polyamide, polyether, polyurethane, polyvinyl chloride, tetrafluoroethylene, urea resin, phenol resin etc. For synthesis of such synthetic high-molecular polymers, the following monomers can be used singly or in plurality: (1) unsaturated carboxylic acids such as (meth) acrylic acid, maleic acid, crotonic acid and itaconic acid, (2) (meth)acrylates such as methyl (meth)acrylate, propyl (meth)acrylate and butyl (meth)acrylate, (3) (meth)acrylic acid amides such as (meth) acrylamide and N-methylol (meth)acrylamide, (4) vinyl esters of fatty carboxylic acids, such as vinyl acetate, vinyl propionate and vinyl laurate, (5) vinyl ethers of alcohols, such as vinyl isobutyl ether and vinyl-n-octyl ether, (6) N-vinyllactams such as N-vinylcaprolactam, (7) vinyl halides and vinylidene halides such as vinyl chloride and vinylidene chloride, (8) aryl vinyl and aryl vinylidene compounds such as styrene and vinyl naphthalene, (9) vinyl nitrile and cyanovinylidene compounds such as acrylonitrile, (10) nitrogenous heterocyclic compounds such as vinyl pyrrolidone and vinyl pyridine and (11) ethylenically unsaturated compounds such as butadiene, chloroprene, isoprene, isobutylene, propylene and butylene.

Further, a cross-linking agent can also be used. The cross-linking agent includes bifunctional cross-linking agents, for example, divinyl compounds such as divinyl benzene, di(meth)acrylate compounds such as ethylene glycol di(meth)acrylate and polyethylene glycol di(meth)acrylate, and multifunctional cross-linking agents such as trimethylol propane tri(meth)acrylate and tetramethylol methane tetra(meth)acrylate. Among these cross-linking agents, divinyl benzene and ethylene glycol di(meth)acrylate are preferable.

Examples of the semi-synthetic polymers include cellulose-based polymers such as ethyl cellulose, methyl cellulose, hydroxyethyl cellulose, hydroxypropyl cellulose and carboxymethyl cellulose, starch-based polymers such as carboxymethyl starch, alginic acid-based polymers such as alginic acid propylene glycol ester, chitin and chitosan etc.

Examples of the natural polymers include polymers derived from plant such as agar and gum arabic, polymers derived from animal, such as gelatin and collagen, natural polysaccharides and polyamino acids etc.

The organic high-molecular polymers are preferably synthetic polymers and semi-synthetic polymers. The synthetic high-molecular polymers are more preferably (meth)acryl copolymers, styrene-butadiene copolymers and styrene-maleic acid copolymers. The semi-synthetic high-molecular polymers are more preferably chitin and chitosan. A particularly preferable organic high-molecular polymer is chitosan. Because of strong hydrogen bonding, chitosan does not dissolve by itself in a solvent other than an acidic aqueous solution. For this reason it is used together with a polymer of another organic acid having a reactive vinyl group and/or a salt thereof. The membrane wall is composed preferably of chitosan and a polymer of the organic acid having a reactive vinyl group and/or a salt thereof.

[Core Material Under Condition (B)]

The materials described in the above item "Core material under Condition (A)" are used, but it is preferable to use at least one member selected from the group consisting of:

(I) ceramide and/or structural analogues of ceramide, and (II) $C_{24-44}$ dialkyl ethers. It is particularly preferable to use at least one member selected from the group consisting of ceramide and/or structural analogues of ceramide and distearyl ethers.

[Method of Producing the Polymer Particles]

As the method of producing the polymer particles of the present invention, conventional methods, such as in situ interfacial polymerization, emulsion-solvent evaporation method, curing coating in liquid, phase separation, melting dispersion cooling, spray drying and pan coating, can be used. Among these methods, a suitable production method can be selected, depending on the organic high-molecular polymer used. The production method is preferably in situ polymerization, liquid-in-drying and interfacial polymerization.

<When (meth)acryl Copolymer is Used as the Organic High-Molecular Polymer>

A (meth)acrylate, (meth)acrylic acid or a salt thereof or a (meth)acrylic acid monomer having a sulfonic acid or phosphoric acid group or a salt thereof is polymerized in a solvent, basically hydrophilic, such as alcohols, ketones and ethers, with an oil-soluble radical initiator such as azobisisobutyronitrile (AIBN) in an amount of 0.1 to 30 mol-% to all the monomers, if necessary with a chain-transfer agent, in nitrogen gas, the solvent being refluxed at 50 to 300° C., according to a known polymerization method such as solution polymerization to obtain the (meth)acrylic copolymer.

Then, this (meth)acryl copolymer is dissolved together with the protecting agent in a solvent such as toluene, and then said solution is dispersed in an aqueous solution containing a surfactant or a polymeric protective colloid and then dispersed with a sonicator to-form polymer particles preferably having an average particle diameter of 10 μm or less. The solvent is distilled away from this dispersion, whereby the polymer particles are prepared.

<When Chitosan and a Polymer of an Organic Acid Having a Reactive Vinyl Group and/or a Salt Thereof are Used as the Organic High-Molecular Polymer>

The polymer particles of the present invention can be produced according to production method 1 or 2 below.

<Production Method 1>

Chitosan, an organic acid having a reactive vinyl group and/or a salt thereof and a protecting agent, and depending on the case, a hydrophobic monomer, an oil-soluble polymerization initiator, and if necessary a non-polymerizable hydrophobic material and a surfactant, are mixed with deionized water and emulsified by mechanical stirring by means of an emulsifier, so that an O/W emulsion containing monomer droplets, preferably having an average particle diameter of 10 μm or less, is prepared. As the emulsifier, a supersonic homogenizer, a homomixer, a milder, an attritor, a (ultra)high-pressure homogenizer, a nanomizer system, a membrane emulsifier etc. can be used. In emulsification, the solid content is preferably in the range of 1 to 60% by weight.

Then, the O/W emulsion prepared in the manner described above is heated and polymerized to produce polymer particles. The polymerization temperature is varied depending on the type of initiator, but is suitably in the range of about 40 to 90° C. The polymerization time is varied depending on the monomer, the type of polymerization initiator and the reaction temperature, but is generally desirably 1 to 24 hours. In addition, a small amount of a water-soluble polymerization initiator may be added in the polymerization in order to polymerize the organic acid having a reactive vinyl group or a salt thereof in water. Further, chitosan and an aqueous solution of a salt of the organic acid having a reactive vinyl group may be added in the polymerization in order to increase the content of chitosan.

<Production Method 2>

Chitosan, an organic acid having a reactive vinyl group and/or a salt thereof, and depending on the case, a hydrophobic monomer, an oil-soluble polymerization initiator, and if necessary a non-polymerizable hydrophobic material and a surfactant, are mixed with deionized water and emulsified by mechanical stirring by means of an emulsifier, so that an O/W emulsion containing monomer droplets, preferably having an average particle diameter of 10 μm or less, is prepared. Thereafter, the emulsion is heated and polymerized in the same manner as in the production method 1 above to prepare polymer particles. An aqueous dispersion of the protecting agent is added to an aqueous suspension of the polymer particles and the protecting agent is absorbed into the polymer particles.

The polymer particles obtained in the production method 1 or 2 may also be neutralized with a base. The base used includes ammonia, methylamine, ethylamine, propylamine, butylamine, isobutylamine, hexylamine, octylamine, an amino-modified silicone, ethylene diamine, propylene diamine, butylene diamine, sodium hydroxide, potassium hydroxide, calcium hydroxide, sodium carbonate, sodium alkoxide, potassium alkoxide etc. The amount of the base added is preferably 0.1 to 2.0 mol %, more preferably 0.6 to 1.2 mol % based on the organic acid polymer in the emulsion.

<Oil-Soluble Polymerization Initiator>

The oil-soluble polymerization initiator used in the production method described above is an initiator that is radical-decomposed by heat or in the presence of a reducing material to initiate addition polymerization of monomers. Oil-soluble peroxides, azobis compounds etc. are generally used. Examples thereof include organic peroxides such as lauroyl peroxide and benzoyl peroxide and azo compounds such as 2,2'-azobisisobutyronitrile. These oil-soluble polymerization initiators can be used singly or in plurality in combination. These oil-soluble polymerization initiators are used preferably in the range of 0.05 to 10.0 parts by weight relative to 100 parts by weight of the hydrophobic monomers.

<Water-Soluble Polymerization Initiator>

The water-insoluble polymerization initiator used as necessary in the production method described above is an initiator that is radical-decomposed by heat or in the presence of a reducing material to initiate addition polymerization of monomers. Water-soluble peroxo disulfates, peroxides, azobis compounds etc. are generally used. Example thereof include peroxo disulfates such as potassium persulfate and ammonium persulfate, peroxides such as hydrogen peroxide and t-butyl hydroperoxide, and azo compounds such as 2,2'-azobis-2-aminodinopropanate (v-50) and 4,4'-azobis-4-cyanopentanoic acid. It can optionally be used as a redox initiator by combination with a reducing agent.

<Non-Polymerizable Hydrophobic Material>

The non-polymerizable hydrophobic material used for emulsification in the production method described above includes wax, a perfume, a plasticizer, a chain transfer agent etc.

<Surfactant>

The surfactant used as necessary in the production method described above includes usual anionic, cationic, nonionic and amphoteric surfactants. For example, the anionic surfactant includes sulfates such as dodecyl sulfate, dodecyl benzene sulfonate and polyoxyethylene nonyl phenyl ether. The nonionic surfactant includes polyethylene oxide alkyl ether, polyethylene oxide alkyl phenyl ether, polyethylene oxide-polypropylene oxide block copolymer etc. The cationic surfactant includes octadecyl trimethyl ammonium chloride etc. The amphoteric surfactant includes alkyl dimethyl aminoacetate betaine, 2-alkyl-N-carboxy-N-hydroxyimidazolinium betaine etc. However, since amphoteric ions are present in the polymer particles, the nonionic surfactant is desirable in consideration of the stability of the particles. Although the amount of the surfactant used is not particularly limited, the surfactant is used desirably in the range of 0.1 to 20% by weight relative to the hydrophobic monomers.

In the production method described above, a water-soluble polymer can also be used as an emulsifying agent. The water-soluble polymer includes e.g. polyvinyl alcohol and derivatives thereof, starch and derivatives thereof, cellulose derivatives etc. These surfactants and water-soluble polymers can be used singly or combination of two or more species thereof.

[Average Particle Diameter of the Polymer Particles]

From the viewpoint of achieving a good stability without precipitation with time, the polymer particles of the present invention have a volume-average particle diameter of 0.001 to 30 $\mu$m, preferably 0.01 to 30 $\mu$m, more preferably 0.05 to 10 $\mu$m. The volume average particle diameter refers to a volume-average particle diameter determined by a laser diffraction-type particle diameter distribution-measuring apparatus (LA-910, manufactured by HORIBA).

The polymer particles of the present invention comprise a protecting agent as the core material, and part thereof may be carried on the outside and/or inside of the membrane wall.

The polymer particles of the invention may preferably have a core-shell structure having the membrane wall as the shell and the core material as a single core included therein or a structure of microcapsules in which the core material is included as multiple cores.

[Fibers]

The fibers used in the present invention include natural fiber such as cotton, silk, hemp and wool, regenerated fibers such as rayon, cuprammonium rayon and tensel, semi-synthetic fibers such as acetate, diacetate and triacetate, and synthetic fibers such as polyester, nylon, acryl, vinylon, polypropylene and polyurethane. The form of fiber includes staple fiber, yarn, nonwoven fabric, knitted cloth, woven cloth etc.

Preferable examples of clothes made of these fibers include those in direct contact with skin and hair, for example underwear such as panty hose, lingerie, petticoats, camisoles, shorts, undershirts, trunks and briefs, foundations such as girdles, brassieres and bodysuits, night wear such as night dress, pajamas and bath robes, and leotards, socks, bellybands, gloves, mufflers, masks, towels and caps, and bedclothes such as pillowcases and sheets.

[Fiber-Treating Composition]

The polymer particles according to the present invention are dispersed in water and/or an organic solvent to prepare a fiber-treating agent. The fiber-treating composition comprises the polymer particles and water and/or an organic solvent. The proportion of the polymer particles incorporated into the fiber-treating composition is preferably 0.1 to 10% by weight.

The organic solvent includes alcohols such as methanol, ethanol, propanol, isopropanol, butanol, hexanol, heptanol and octanol, polar solvents such as acetone, acetonitrile-, tetrahydrofuran, dioxane and ethyl acetate, and non-polar solvents such as cyclohexane, hexane, heptane and octane. Such solvents can also be used as a mixture with water in an arbitrary ratio.

[Method of Treating Fibers]

As the method of treating fiber in the present invention, there is a method of directly contacting the polymer particles with fiber or a method of contacting the fiber-treating agent with fiber. The method of directly contacting the polymer particles with fiber includes a method of kneading the polymer particles into fiber. The method of contacting the fiber-treating agent with fiber includes a method of dipping fiber in the fiber-treating agent and then drying it and a method of spraying fiber with the fiber-treating agent and then drying it. By such a treatment, it is possible to obtain fiber having the polymer particles continuously or discontinuously present on the surface thereof.

The specific method of treating fibers includes a pad dry method using a mangle, a dryer etc., a dipping method using a wince, a cheese-dyeing machine, a liquid-flow dyeing machine etc., a spray method, a coating method, an imprinting method, and a method of kneading rayon, acryl fibers etc.

The fiber-treating method of the present invention can be preferably conducted with the polymer particles or the fiber-treating agent so that the amount of the protecting agent may be 0.05 to 5% by weight of the fiber.

For treatment of fibers, a binder may or may not be used, but for resistance to washing, a binder is preferably used. The binder includes e.g. silicone resin, acryl resin, urethane resin, vinyl acetate resin etc. Depending on purposes, it is possible to employ not only the binder used in combination, but also a softer, a hard-finish agent, a sewing improver, a flame-retardant, an antistatic, a stain-proofing agent, an antimicrobial deodorizing agent, a hair-raising agent, a slip-preventing agent, a humectant, a water repellant, a water absorbent, a fluorescent dye, a shrinkage-preventing agent such as glyoxal and fixing agents.

From the viewpoint of achieving a good washing durability and the fiber-treating effect, the solid content of the binder is preferably 10 to 500% by weight, more preferably 50 to 300% by weight of the polymer particles.

For example by inclusion of a protecting agent being unstable in an ordinary emulsion system such as cream and milky lotion, the polymer particles of the present invention can be used as means of supplying a stable agent to the skin or the hair.

In fiber products treated with the polymer particles, the protecting agent will soak out of the polymer particles, for example by breaking of the membrane wall by physical pressure etc, and diffuse into the fiber products, so that the fiber products may become excellent in feeling in touch such as moist feel, smooth feel, fluffy feel, softness and cared feeling of hands. Even if the fiber products are repeatedly washed, the good feeling can be maintained as they are. By wearing the fiber products, the protecting agent will diffuse into the skin and/or the hair to achieve advantages such as protection, improvement and treatment of the skin and/or the hair.

EXAMPLES

Example 1

640 g water was added to 20 g commercial chitosan, Daichitosan P (VL), having deacetylation degree of 85 to 88%, trademark of Dainichiseika Color & Chemicals Mgf. Co., Ltd., then 20 g of methacrylic acid was added thereto and the mixture was dissolved at a room temperature under stirring to prepare an aqueous solution of chitosan/methacrylic acid.

Separately, 1.0 g of ceramide A represented by the below shown formula (A) below, being the structural ceramide analogue of the formula (2) wherein $R^3$ is a $C_{16}$ linear saturated hydrocarbon group and $R^4$ is a $C_{15}$ linear saturated hydrocarbon group, 4.0 g of cholesteryl hemihexadecenyl succinate represented by the below shown formula (B), being a cholesterol derivative, referred to hereinafter as compound (B), of the formula (3) wherein $R^5$ is —$CH_2$—$CHR^6$—and R6 is a hexadecenyl group, and 15 g of lauryl methacrylate were dissolved by heating and then cooled to a room temperature. Then 0.23 g lauroyl peroxide was added thereto and dissolved. 680 g of the previously prepared aqueous solution of chitosan/methacrylic acid was added thereto. The mixture was treated with an ultrasonic homogenizer, manufactured by Nippon Seiki Seisakusho, under stirring at a liquid temperature of 30 to 40° C. for 15 minutes to obtain an emulsion having an average particle diameter of 2.1 μm. This emulsion was transferred to a 1-L glass reactor equipped with a stirrer, a condenser and a nitrogen gas inlet tube and, having been replaced by nitrogen gas, the mixture was heated to 75° C. under stirring. After the polymerization for 2 hours under stirring, a solution of 0.2 g of sodium persulfate dissolved in 20 g of water was added thereto and the mixture was further stirred at 75° C. for 2 hours to obtain an emulsion of a ceramide-including polymer having an average particle diameter of 3.9 μm. It was found by observation with a polarization microscope that the ceramide had been included in the polymer without crystallization of the ceramide.

ceramid A

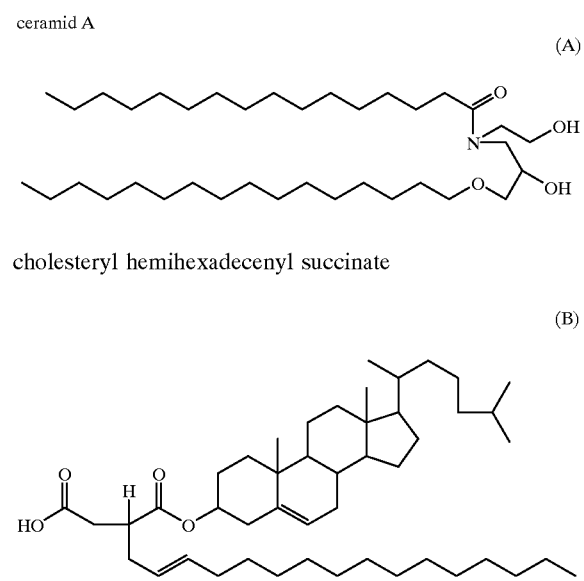

cholesteryl hemihexadecenyl succinate

Example 2

898 g of water was added to 25 g of commercial chitosan, Daichitosan P (VL) having deacetylation degree of 85 to 88%, manufactured by Dainichiseika Colour &Chemicals Mgf. Co., Ltd. Then 13 g of methacrylic acid and 14 g of acrylic acid were added thereto. The mixture was dissolved at a room temperature under stirring to prepare an aqueous solution of chitosan/methacrylic acid/acrylic acid. Separately, 5 g of ceramide A, 20 g of the compound B and 25 g of lauryl methacrylate were dissolved by heating and then cooled to a room temperature and 0.23 g of lauroyl peroxide was added thereto and dissolved. 950 g of the previously prepared aqueous solution of chitosan/methacrylic acid/acrylic acid was added thereto and treated with an ultrasonic homogenizer, manufactured by Nippon Seiki Seisakusho, under stirring at a liquid temperature of 30 to 40° C. for 15 minutes to obtain an emulsion having an average particle diameter of 4.2 μm. This emulsion was transferred to a 1-L glass reactor equipped with a stirrer, a condenser and a nitrogen gas inlet tube and, having been replaced by nitrogen gas, the mixture was heated to 75° C. under stirring. After the polymerization for 2 hours under stirring, a solution of 0.2 g of sodium persulfate dissolved in 20 g of water was added thereto and the mixture was further stirred at 75° C. for 2 hours to obtain an emulsion of a ceramide-including polymer having an average particle diameter of 4.7 μm. It was found by observation with a polarization microscope that ceramide had been included in the polymer without crystallization of ceramide.

Example 3

An emulsion of a distearyl ether-including polymer having an average particle diameter of 1.2 μm was obtained in the same manner as in Example 1 except that distearyl ether was used in place of the ceramide A and the compound B. It was found by observation with a polarization microscope that distearyl ether was included in the polymer without crystallization of distearyl ether.

Example 4

An emulsion of a squalane-including polymer having an average particle diameter of 5.2 μm was obtained in the same manner as in Example 2 except that squalane was used in place of the ceramide A and the compound B.

Example 5

5 g of the ceramide A, 20 g of the compound B, 20 g of a previously synthesized copolymer of methyl methacrylate and methacrylic acid, having a monomer weight ratio of 95/5, a weight-average molecular weight of 85,000, and 300 g of toluene were introduced into a 500-ml beaker and dissolved. The resulting solution was poured into 1500 g of 1% aqueous polyvinyl alcohol, Gosenol GH-17 being tradename of The Nippon Synthetic Chemical Industry, Co., Ltd., and dispersed by a sonicator to have an average particle diameter of 5.2 μm. The resulting dispersion was introduced into a 2000-ml separable flask. The toluene was distilled away by heating it at a reduced pressure with stirring at 200 rpm to obtain an emulsion of a ceramide-including polymer having an average particle diameter of 5.5 μm. It was found by observation with a polarization microscope that ceramide was included in the polymer without crystallization of ceramide.

Comparative Example 1

The same procedures as in Example 1 were carried out except that 5% aqueous polyvinyl alcohol was used in place of the aqueous solution of chitosan/methacrylic acid and the ceramide A only was used in place of the mixture of the ceramide A and the compound B. As results considerable aggregates of crystals of the ceramide A floated in the emulsification step and the desired emulsion of ceramide could not be obtained.

Comparative Example 2

A squalane emulsion having an average particle diameter of 2.7 μm was obtained in the same manner as in Example 3 except that 5% aqueous polyvinyl alcohol was used in place of the aqueous solution of chitosan/methacrylic acid.

Comparative Example 3

A squalane emulsion having an average particle diameter of 0.8 μm was obtained by treating squalane in 1% aqueous sodium dodecyl sulfonate with an ultrasonic homogenizer manufactured by Nippon Seiki Seisakusho.

Test Example 1

Pieces of cotton fiber were dipped in the aqueous emulsion solutions obtained in Examples 1 to 5 and Comparative Examples 2 to 3. The pieces of cotton fibers were squeezed with a mangle so as to permit the protecting agent to remain in an amount of 0.05% by weight of the dried fiber before treatment and then were dried at 90° C. for 1 minute to obtain treated fibers of the present invention and comparatively treated fibers.

Ten examiners judged these treated fibers, using the evaluation scores shown in Table 1 in view of feeling in touch by hand. The average scores were calculated. As control, untreated cotton fibers were used. The results are shown in Table 2.

TABLE 1

| Valuation | Feeling moist | Feeling smooth | Feeling plump | Feeling soft | Feeling cared for hands |
|---|---|---|---|---|---|
| 5 | Feels very moist | Feels very smooth | Feels very plump | Feels very soft | Feels very cared for hands |
| 4 | Feels moist | Feels smooth | Feels plump | Feels soft | Feels cared for hands |
| 3 | feels slightly moist | Feels slightly smoo | Feels slightly plum | Feels slightly soft | Feels slightly cared for hands |
| 2 | The same as untreated fibers | The same as untreated fibers | The same as untreated fibers | The same as untreated fibers | The same as untreated fibers |
| 1 | Inferior in moist feeling to | Inferior in smooth feeling to | Inferior in plump feeling to | Inferior in soft feeling to | feels more rough on hands than by |

TABLE 2

| The result of valuation | Example | | | | | Comparative example | |
|---|---|---|---|---|---|---|---|
| | 1 | 2 | 3 | 4 | 5 | 2 | 3 |
| Feeling moist | 4.7 | 5 | 4.3 | 4.4 | 4.2 | 1.2 | 2.2 |
| Feeling smooth | 4.8 | 5 | 4.8 | 4.5 | 4.3 | 1 | 1.3 |
| Feeling plump | 4.6 | 4.8 | 4.6 | 4.4 | 4.4 | 1.3 | 1.8 |
| Feeling soft | 4.6 | 4.7 | 4.3 | 4.6 | 4.6 | 1.2 | 2.3 |
| Feeling cared for hands | 4.6 | 4.9 | 4.4 | 4.3 | 4.3 | 1.1 | 2.1 |

Test Example 2

100 g of a silicone-based fiber-fixing agent, TF3500 being tradename of Kitahiro Chemical, diluted 50-fold in water in advance, was fixed by treatment onto 100 g of each treated fiber obtained in Test Example 1. It was dried at 90° C. for 1 min. to obtain the desired treated fiber. Ten examiner judged these treated fibers, using the evaluation scores in Table 1 in view of feeling in touch by hand. The average scores were calculated. Further, the treated fibers were washed repeatedly 10 times with a neutral detergent and then judged in the same manner as above. The average scores were calculated. As control, untreated cotton fibers subjected to the same washing treatment were used. The results are shown in Table 3.

TABLE 3

| The result of valuation Washing treatment | Example 1 | | Example 2 | | Example 3 | | Example 4 | | Example 5 | | Comparative example 1 | | Comparative example 2 | |
|---|---|---|---|---|---|---|---|---|---|---|---|---|---|---|
| | Before | After | Before | After | Before | After | Before | After | Before | After | Before | After | Before | After |
| Feeling moist | 4.6 | 4.5 | 5.0 | 4.9 | 4.3 | 4.1 | 4.3 | 4.2 | 4.1 | 4.0 | 1.5 | 1.4 | 2.3 | 1.9 |
| Feeling smooth | 4.9 | 4.7 | 4.9 | 4.8 | 4.7 | 4.5 | 4.4 | 4.1 | 4.5 | 4.0 | 1.4 | 1.2 | 2.2 | 2.1 |
| Feeling plump | 4.7 | 4.5 | 4.7 | 4.6 | 4.6 | 4.4 | 4.4 | 4.4 | 4.2 | 4.2 | 1.5 | 1.3 | 1.9 | 1.6 |
| Feeling soft | 4.6 | 4.4 | 4.7 | 4.7 | 4.2 | 4.1 | 4.3 | 4.3 | 4.1 | 4.1 | 1.6 | 1.6 | 2.2 | 1.9 |
| Feeling cared for hands | 4.5 | 4.4 | 4.9 | 4.7 | 4.3 | 4.2 | 4.2 | 4.1 | 4.0 | 4.0 | 1.3 | 1.2 | 2.1 | 1.5 |

What is claimed is:

1. Polymer particles having a volume average particle diameter of 0.001 to 30 μm, which satisfy at least one of conditions (A) and (B):

Condition (A) where the polymer particles comprise chitosan and a polymer (a) of an organic acid having a reactive vinyl group and/or a salt thereof as the membrane wall and a hydrophobic protecting agent for skin and/or hair (referred to hereinafter as the protecting agent) (b) as the core material;

Condition (B) where the polymer particles comprise an organic polymer (c) as the membrane wall and at least one member selected from the group consisting of:

(I) ceramide and/or structural analogues of ceramide and (II) $C_{24-44}$ dialkyl ethers.

2. The polymer particles according to claim 1, which comprise chitosan and a polymer (a) of an organic acid having a reactive vinyl group and/or a salt thereof as the membrane wall and the protecting agent (b) and a polymer (d) of a hydrophobic monomer as the core material.

3. A method of treating fiber, which comprises bringing the polymer particles of claim 1 in contact with the fiber.

4. A fiber product having the polymer particles according to claim 1 or 2 continuously or discontinuously on the surface thereof.

* * * * *